July 9, 1935.     C. H. BRASELTON     2,007,927
LONG WAVE LENGTH RADIATION DEVICE
Filed Dec. 7, 1931     3 Sheets-Sheet 1
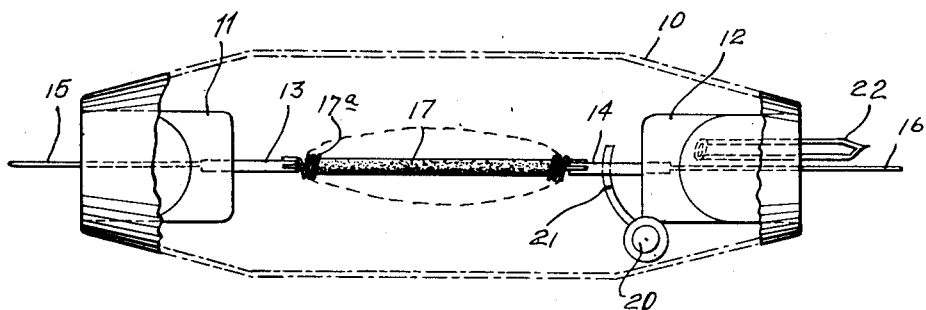
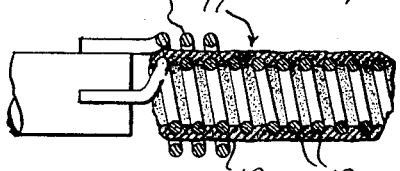
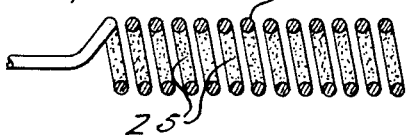
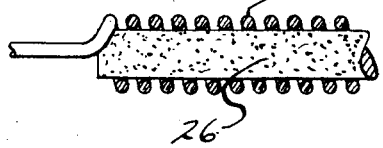
INVENTOR July 9, 1935.  C. H. BRASELTON  2,007,927
LONG WAVE LENGTH RADIATION DEVICE
Filed Dec. 7, 1931  3 Sheets-Sheet 2

INVENTOR

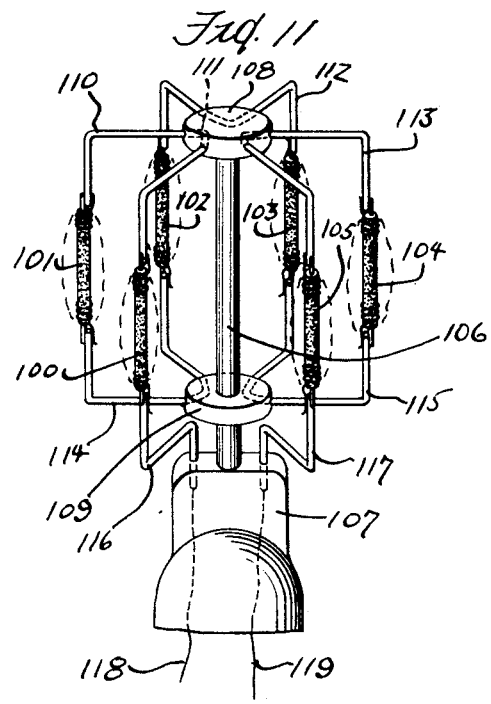
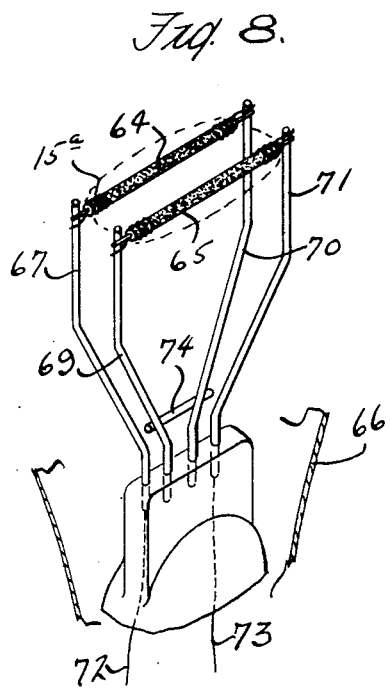
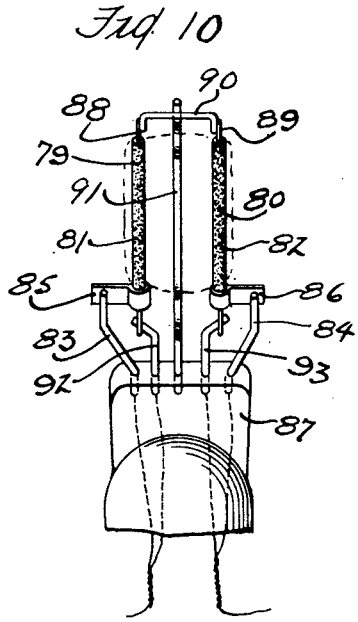
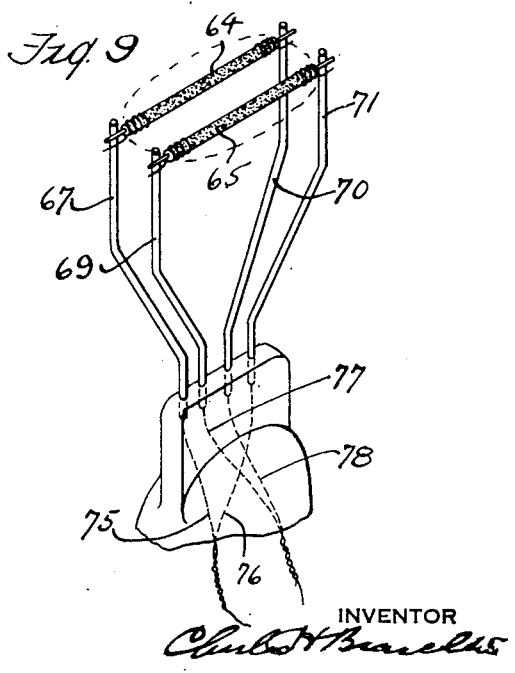

Patented July 9, 1935

2,007,927

UNITED STATES PATENT OFFICE 2,007,927

LONG WAVE LENGTH RADIATION DEVICE

Chester H. Braselton, New York, N. Y., assignor to Sirian Lamp Company, Newark, N. J., a corporation of Delaware Application December 7, 1931, Serial No. 579,589

7 Claims. (Cl. 176—1)

This invention relates to radiation devices and particularly to such devices for producing long wave lengths such as infra-red rays.

One of the objects of the invention is to provide a radiation device which will produce infra-red rays or other long wave length radiation when attached to commercial lighting circuits without the use of auxiliary equipment.

Another object of the invention is to provide a radiation device for producing long wave length radiation which depends for its operation on the ionization of a gas or vapor within the device.

Another object of the invention is to provide a radiation device for long wave length radiation which is simple, easy to construct, and is inexpensive to manufacture and operate.

Other objects and objects relating particularly to the method of constructing and assembling the various parts will be apparent as the description of the invention proceeds.

One embodiment of the invention has been illustrated in the accompanying drawings in which:

Fig. 1 is an elevational view of my improved radiation device;

Fig. 2 is an enlarged longitudinal sectional view of one end of the electron emitting element shown in Fig. 1;

Figs. 3 and 4 are longitudinal sectional views of two other modified forms of electron emitting element;

Figure 5:
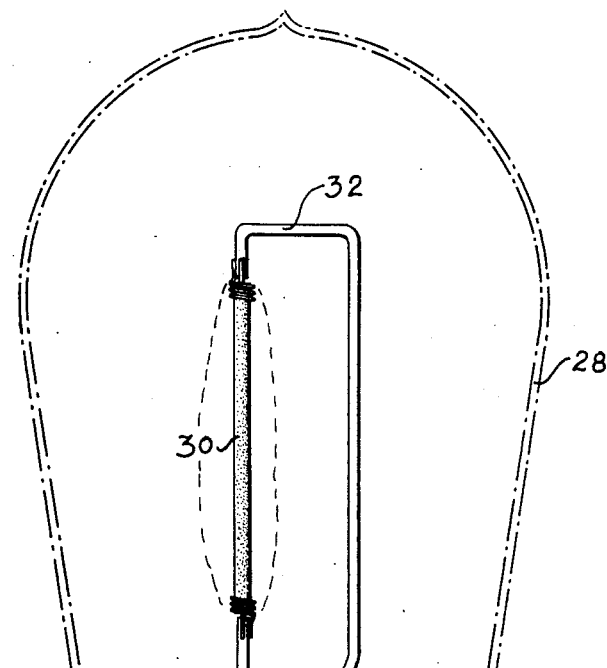
Fig. 5 is a sectional elevation of a modified form of the invention.

Figs. 8, 9, and 10 are perspective views of additional embodiments of the invention; and Fig. 11 is a perspective view of an element structure illustrating one way in which a plurality of elements may be mounted.

In my application entitled Electrical discharge device filed June 3, 1930, Serial No. 459,048, I have shown and described a radiating device in which a coil of resistance wire is coated with electron emitting material and when energized in the presence of an ionizable gas at a certain pressure below atmospheric the gas is apparently ionized in the immediate vicinity of the coil and a conducting path is provided adjacent the filament through which current flows lengthwise of the filament producing a halo around the filament which has an intense illumination.

The present invention is intended to operate on this principle but, by a particular combination of gases and metal vapors used in the envelope, to produce infra-red or other long wave length radiation.

Referring now more specifically to the drawings the invention is shown comprising a tubular envelope 10, formed of quartz glass, borosilicate, or other material which will permit rays of the desired wave length to pass therethrough, and having a press 11 at one end thereof and a second press 12 at the other end, both of which are formed integrally with the envelope in a manner well known in the art. A support rod 13 may be sealed in the press 11 and a second support rod 14 may be sealed in the press 12 with leading in wires 15 and 16 connected respectively to support rods 14 and 15.

Between the rods 13 and 14 I position the electron emitting element 17 which may comprise a coil of resistance wire 18 (see Fig. 2) which is wound relatively closely in a small diameter to form a coil and which may be coated with electron emitting material 19. The resistance wire may be any of the well known resistance metals such as tungsten, molybdenum, tantalum, nichrome, or other desirable material. The electron emitting material may comprise any of the well known materials used for that purpose, such as the oxides of the alkaline earth metals or mixtures of such oxides held together with a suitable binder.

The envelope 10 may be filled with an ionizable gas preferably having a high conductivity such as helium athough other inert gases may be used such as argon, neon, krypton, and xenon. Also in the envelope 10 I provide a small quantity of a metal vapor such as the vapors of rubidium or cadmium the former being preferred as it vaporizes at a more practical temperature than cadmium.

The metal vapor may be inserted in the envelope by means of a container 20 into which a salt of the metal, such as rubidium chloride, and a small quantity of calcium or magnesium may be placed while the container may be supported by means of a wire 21 to one of the support rods, as the rod 14.

The device constructed as indicated in Fig. 1 with the electron emitting element between the presses may be connected to a vacuum pump by means of the tube 22 in a manner well known in the art. An oven may be placed over it to raise the temperature to between 350 and 400° C. or to as high a temperature as the material of the envelope will stand without deforming. A current may be run through the filament at this time to raise the temperature to about 600° C. or to a dull red heat. This drives out the occluded gases from the filament and other parts of the bulb.

When no more gas appears to be within the envelope as is evidenced by a lack of fluorescence when high tension current is directed against the walls of the envelope from an induction coil, the filament current may be increased to about 800° C. or to a bright red heat to drive out the binder for the electron emitting material and other occluded gases and when no more gases appear on the bulb the oven may be raised and the filament current increased for a moment to slightly less than 1200° C., the pump being connected all this time to remove any gases which may be driven off.

When no more gases appear in the bulb the pump may be turned off and the filament current turned off and a small amount of an inert gas such as neon gas, at about ½ mm. pressure, may be admitted to the bulb and the filament current turned on again and gradually increased. Spots of localized discharge will then appear on the filament and support rods and will gradually spread until the whole envelope is filled with a diffused glow. This appears to activate the electron emitting material and the process should be continued until the glow is uniform throughout the entire bulb which should take less than ten minutes. If white spots appear on the element or support rods it is an indication that there are more gases or vapors within the bulb and the pump should be connected again and the gases pumped out and the process of activation repeated.

When the activation is completed the pump may then be connected to the bulb again to withdraw any gases which may have been driven off during the activation process and a high vacuum of about .5 micron is preferably obtained. Then the pump may be turned off, the filament current may be disconnected, and about 200 mm. of helium gas may be admitted into the bulb and the bulb sealed off. The container 20 is then heated as by external bombardment in a manner well known in the art to flash the calcium at which time the calcium combines with the rubidium chloride to form calcium chloride and liberates rubidium which condenses on the walls of the bulb to be evaporated when the bulb is heated in use.

Cadmium vapor may be used but inasmuch as the cadmium has such a high temperature of vaporization the whole envelope must be heated to a high degree before the cadmium will vaporize within the device and produce the desired effect. As helium gas is a good heat conductor there is sufficient conductivity in the envelope to heat the rubidium metal sufficient to vaporize it and thereby the infra-red radiation is produced in the vicinity of the filament.

The electron emitting element may assume various forms. In Fig. 3 the individual turns of the coil 24 are coated with electron emitting material 25 so that a space is left between every two adjacent turns while in Fig. 4 a core 26 of electron emitting material is provided within the coil 27. The coil of resistance wire may also be coated intermittently along its length with the electron emitting material, or a larger coil may be used, or the coil may be provided with a greater pitch, or a single straight filament, having electron emitting material incorporated therein such as the well-known thoriated tungsten filament which may be made by treating tungstic acid and thorium nitrate may be used, it apparently being desirable that the electron emitting material be in contact with a portion of the resistance unit.

When the current is turned on it passes through the lead-in wire 15, the support rod 13, the electron emitting element 17, the support rod 14, and out through the lead-in wire 16. When the electron emitting element is heated the gas in the vicinity thereof forms a conductive path and a halo of radiation appears around the element throughout its length. The heating of the gas in the envelope tends to vaporize the rubidium as condensed on the inner walls of the envelope or other parts of the device and the ionization of the rubidium vapor and the helium produces the desired infra-red radiation.

In order to take care of the additional current flowing when the element is energized I may prefer to provide additional terminals at each end of the element as the coil 17a which may consist of a few turns of tungsten or other wire capable of standing a high temperature positioned at each end of the element and welded to the support rods as shown in Figs. 1 and 2. The diameter of this wire should be sufficient to carry the additional current but it should not be large enough to cool down the ends of the filament. It may or may not be coated with electron emitting material, as desired.

In Fig. 5 a modified form of the invention is shown. In this case the envelope 28 of glass or other material, transparent to the rays to be produced by the lamp is provided with a single press 29 formed integral therewith in the usual manner and the electron emitting element 30 is supported at its lower end upon a support rod 31 sealed in the press 29 and at its upper end upon a support rod 32 which extends horizontally toward the wall of the envelope and then downwardly where it may be sealed in the press 29. A pair of leading-in wires 33 and 34 may be connected respectively to the support rods 31 and 32 to form the means for connecting the device in an electrical circuit. The electron emitting element 30 may be any of the elements already described and the envelope may be filled with gases or vapors as described in connection with the previous figure. Inasmuch as the metal vapors tend to condense on the walls of the bulb and other parts, the tubular construction of Fig. 1 may be preferred as in the construction of Fig. 5 the path between the two support rods 31 and 32 on the press 29 is so short that a film of metal on the press may tend to short circuit the device.

Due to the conductivity of the gas within the envelope there may be a tendency, in case the element burns out, to arc, which so lowers the resistance of the device as to endanger the fuses in the main circuit. I therefore may prefer to incorporate a fuse in the element circuit either within or outside of the envelope so that this fuse will burn out if an arc should start and protect the main fuses in the circuit. In Fig. 5 such a fuse 35 is shown connected as a part of the lead wire 33 at the bottom of the envelope within the stem tube and just below the press 29. Thus positioned the fuse comes within the base of the lamp and is not noticeable.

Figure 6:
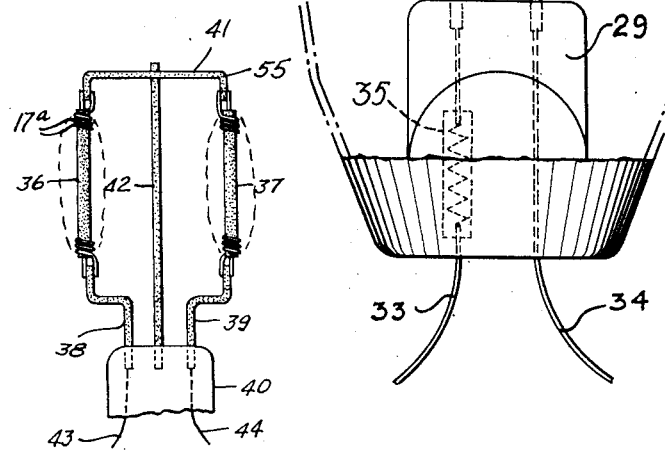
Figs. 6 and 7 are elevational views of two other embodiments of the invention.

In Fig. 6 a modified form of the invention is shown wherein two electron emitting elements 36 and 37 are mounted at their lower ends respectively upon two support rods 38 and 39 which are sealed in the press 40. The upper ends of the elements 36 and 37 may be connected to a cross member 41 which may in turn be welded to a central support 42 which extends downwardly and may also be sealed in the press 40. Leading-in wires 43 and 44 may be connected respectively to the support rods 38 and 39 to make the necessary connections outside of the device. The additional coils 17a carrying the excess current when the element is energized are shown at each end of each of the elements 36 and 37.

Figure 7:
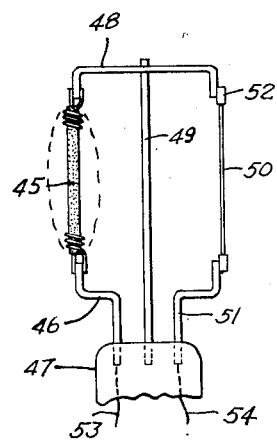

Due to the fact that a metal filament has less resistance when cold there may be a tendency to produce a surge of current in the circuit when the device is initially connected to a source of energy and in order to prevent this I may desire to place a resistor having a negative temperature coefficient of resistance in series with the element or elements which will then provide a high resistance when the device is cold and as the resistance of the element increases due to the increase in temperature the resistance of the resistor will decrease. In Fig. 7 such a construction is shown wherein the electron emitting element 45 is mounted at its lower end upon a support rod 46 which is sealed in the press 47 while its upper end is connected to a cross member 48 mounted upon a central support 49 which may also be sealed in the press 47. A rod or filament 50 of carbon may have its upper end attached to the other end of the cross member 48 and its lower end connected to a support rod 51 which may be sealed in the press 47, suitable means such as the tabs 52 being provided at each end of the carbon filament 50 making the connections to the support rods. Leading-in wires 53 and 54 may be connected respectively to support rods 46 and 51 and when connected in a circuit and a current initially turned on the carbon filament 50 has a high enough resistance to prevent a surge through the element 45 and as the element 45 and the carbon filament 50 heat up the resistance of the first increases while the resistance of the second decreases thereby permitting a gradual increase of current without the tendency to surge.

It may be desirable in view of the electrical conductivity of the gases used to insulate all of the exposed parts other than the electron emitting element (or carbon filament of Fig. 7) from the gas. This may be done by coating the support rods with an insulating compound. This insulation material may be any insulation material having a high insulation factor and being capable of adherring to the metal rods and of being degasified, such as a mixture of finely divided aluminum oxide and a small quantity of aluminum chloride dissolved in water to make a paste. When this material is heated in an oxidizing atmosphere the aluminum chloride reacts with oxygen to form aluminum oxide liberating chlorine. The aluminum oxide thus chemically formed is so finely divided as to form an intergrain cement between the particles of the main body of aluminum oxide thus forming when the reaction is completed an entire body of insulating material containing no inactive matter and which adheres very closely to a wire or other metal parts upon which the insulation material is applied. Such material is shown at 55 applied to the exposed parts of Fig. 6 and it is to be understood that these coated parts should be degasified previously to assembling the device as it is difficult to raise the temperature thereof sufficiently to degasify them during the evacuation of the envelope.

Other means of insulating the parts might be used such as surrounding the support rods with tubes of glass, quartz, isolantite, lavite, and the like, which may be fused to the press to make a gas tight connection.

In Fig. 8 a construction is shown in which a pair of spaced apart electron emitting elements 64 and 65 are supported in substantially parallel relation in the envelope 66. One end of the element 64 is mounted upon a support rod 67 which extends downwardly and is sealed in the press 68 while the corresponding end of the element 65 is mounted upon a support rod 69 also sealed in the press 68. The opposite end of the element 64 is mounted upon a support rod 70 which extends downwardly and is sealed in the press 68 and the corresponding end of the element 65 is mounted upon a support rod 71 which is also sealed in the press 68. The additional coil 15a may also be used at the ends of the element as indicated and as already described in connection with the other figures. The leading-in wires 72 and 73 may be connected respectively to support rods 67 and 71 and a short connector 74 may be connected between the rods 69 and 70. When the wires 72 and 73 are connected across a circuit current will flow through the elements 64 and 65 in the same direction although these elements are in series with each other and all points on the element 64 therefore will have the same potential difference from corresponding points on the element 65 and there will be a tendency for a discharge to appear between the two elements as well as the halo of discharge longitudinally of each element.

While these elements in Fig. 8 are shown connected in series the same effect may be obtained by connecting the elements in parallel as indicated in Fig. 9. Here the parts are just the same as shown in Fig. 8 with the exception of the leading-in wires. Leading-in wires 75 and 76 connected respectively to the support rods 67 and 71 and corresponding to the leading-in wires 72 and 73 of Fig. 8 may be connected together to one side of the circut while two more leading-in wires 77 and 78 may be connected respectively to the support rods 69 and 70 and may also be connected together and to the other side of the circuit. This will place the two elements 64 and 65 in parallel with the current flowing in opposite directions through the elements and thus they are given a uniform potential drop between the elements throughout the length thereof.

In Fig. 10 a still further modification of the invention is shown in which a pair of unipotential cathodes 79 and 80, made of suitable sheet metal and coated with electron emitting material 81 and 82 respectively, may be mounted upon two support rods 83 and 84 respectively by means of bands 85 and 86. The support rods 83 and 84 may be sealed in the press 87. Each of the cathodes is provided with a heater element which extends through the center thereof and is insulated therefrom. Thus the cathode 79 is provided with a heater element 88 while the cathode 80 is provided with a heater element 89 these elements being connected at their upper ends to a cross member 90 supported upon an offset central support member 91 which extends downwardly and is sealed in the press 87. The lower ends of the heating elements are mounted respectively upon rods 92 and 93 which may also be sealed in the press 87. Leading-in wires 94 and 95 may be connected respectively to the support rods 92 and 93 and complete the energizing circuit for the heater element. The leading-in wires 96 and 97, connected respectively to the support rods 83 and 84 for the cathodes, may be connected respectively to the leading-in wires 94 and 95 causing the cathodes to be connected to the high potential sides of the circuit. When the cathodes are raised to electron emitting temperature the discharge will take place between them and will be substantially uniform due to the fact that the potential of each cathode is uniform throughout the length thereof.

It is to be noted that any of the constructions shown may be combined with any of the others as for instance the fuse and carbon filament ballast may be used with the constructions shown in Figs. 8, 9, 10, and 11 as well as Figs. 1 to 5 inclusive and the insulating materials may be applied to the support rods of any of the figures as described in connection with Fig. 6.

Instead of using one long electron emitting element or two elements in series as shown in the figures already described it may be desirable when the device is used on the ordinary lighting circuit of 110 volts to split up the electron emitting elements into a number of separate units so as to reduce the voltage per unit to a value as low as between 10 and 40 volts. One way of doing this is illustrated in Fig. 11 in which a plurality of short elements 100, 101, 102, 103, 104, and 105 are mounted in series, the elements being positioned as far apart from each other as possible so that the discharge along one unit cannot interfere with the discharge along any other.

To this end a glass rod 106 may be formed integral with a press 107 and may have an enlargement or disc 108 at its upper end and a disc 109 at its lower end adjacent the press 107. A support rod 110 may be bent in the form of a V with its vertex 111 sealed in the glass disc 108 and its free ends extending outwardly and being bent downwardly to support the upper ends of the elements 100 and 101. A second V-shaped support rod 112 may have its vertex sealed in the disc 108 similarly to the rod 110 and may support at its free ends the elements 102 and 103. Similarly a V-shaped support rod 115 may be sealed in the disc 108 and may support the upper ends of the elements 104 and 105 in the manner shown. In like manner a pair of V-shaped support rods 114 and 115 may be sealed in the lower disc 109 so as to come respectively underneath points between the upper support rods 110 and 112, and 112 and 113, and these rods may support the lower ends of the elements 101 and 102, and 103 and 104 respectively. A support rod 116 sealed in the press 107 may be bent outwardly and may be attached to the lower end of the element 100 while another support rod 117 sealed in the press 107 may be bent outwardly to support the lower end of the element 105.

Leading-in wires 118 and 119 may be attached to the rods 116 and 117 respectively for making the outside connections to the device. Thus connected as clearly illustrated in Fig. 11 and when the lead wires 118 and 119 are connected across the circuit the current will flow in through the lead wire 118, through the support rod 116, up through the first element 100, through the support rod 110, down through the element 101, through the support rod 114, up through the element 102, through the support rod 112, down through the element 103, through the support rod 115, up through the element 104, through the support rod 113, down through the element 105, and out through the support rod 117 and lead in wire 119.

By using six elements as shown the voltage drop across each element will be eighteen or nineteen volts.

While certain specific pressures have been referred to with respect to the gas in the envelope the pressure may be varied depending on the desired size of the discharge. A lower pressure tends to permit the discharge to extend further away from the filament and a higher pressure tends to confine it closer to the filament. It is preferable that the gases used should be chemically pure or at least should not contain more than one per cent impurities.

A feature of the invention is the fact that vaporization of the filament appears to be somewhat reduced by the ionized region of gas thus permitting heating the filament to a higher temperature without discoloring the bulb or deteriorating the filament.

While a single element is shown in the device it will be evident that a plurality of such elements may be used connected in series or parallel, if desired, depending on the desired voltage and current consumption of the devices.

Other modifications of the invention may be resorted to without departing from the spirit thereof, and I do not therefore desire to limit myself to what has been shown and described except as such limitations occur in the appended claims.

What I desire to claim is:

1. A radiation device for producing long wave length radiation comprising a continuous filamentary resistance wire forming a radiator, electron emitting material in contact with the wire of said radiator, a conductive gas containing rubidium vapor surrounding said wire, and means to maintain said gas around the wire, said wire and electron emitting material forming the sole source of the discharge of the device.

2. A radiation device for producing long wave length radiation comprising a continuous filamentary resistance wire forming a radiator, electron emitting material in contact with a wire of said radiator, an ionizable gas containing a conductive gas and rubidium vapor surrounding said wire and having a pressure such that the visible ionization of said gas is confined to the region of said wire when said wire is energized, and means to maintain said gas around the wire, said wire and electron emitting material forming the sole source of the discharge of the device.

3. A radiation device for producing long wave length radiation comprising a filamentary resistance wire, electron emitting material in contact with a portion of said wire, an ionizable gas containing rubidium vapor and having a pressure in the neighborhood of 200 mm. of mercury surrounding said element, and means to maintain said gas around said wire.

4. An electric radiation device for producing long wave length radiation comprising a filamentary coil of resistance wire, a coating of electron emitting material on the surface of said coil, an ionizable conductive gas at a pressure of about 200 mm. of mercury and containing rubidium vapor surrounding said coil, and means to maintain said gas around the wire, said wire and electron emitting material forming the sole source of the discharge of the device.

5. An electric radiation device for producing long wave length radiation comprising a continuous filamentary coil of resistance wire, a coating of electron emitting material upon the surface of said coil, an ionizable gas containing a mixture of helium and rubidium vapor surrounding said coil and having a pressure such that the ionization of said gas is confined to the vicinity of said coil when said coil is energized, and means to maintain said gas around the wire, said wire and electron emitting material forming the sole source of the discharge of the device.

6. An electric radiation device for producing long wave length radiation comprising an envelope, a coil of filamentary resistance wire within said envelope, a coating of electron emitting material upon the surface of said coil, and a mixture of about 200 mm. of helium gas, and a trace of rubidium vapor within said envelope and surrounding said coil.

7. An electric radiation device for producing long wave length radiation comprising an envelope, a continuous electron emitting element within said envelope, means to support said element, an ionizable gas containing rubidium vapor surrounding said element, said gas having a pressure at which when subjected to ionization a layer of ionized gases is confined about said electron emitting element, means to insulate said supporting means from said gas, and a carbon resistor having a negative temperature cofficient of resistance in series with said fuse and element, said element forming the sole effective source of the discharge of the device.

CHESTER H. BRASELTON.